Jan. 12, 1943. LE ROY M. DEARING 2,307,996
COLOR CORRECTION IN MULTI-LAYER COLOR FILM
Filed April 6, 1940 2 Sheets-Sheet 1

LE ROY M. DEARING
INVENTOR
BY
ATTORNEYS

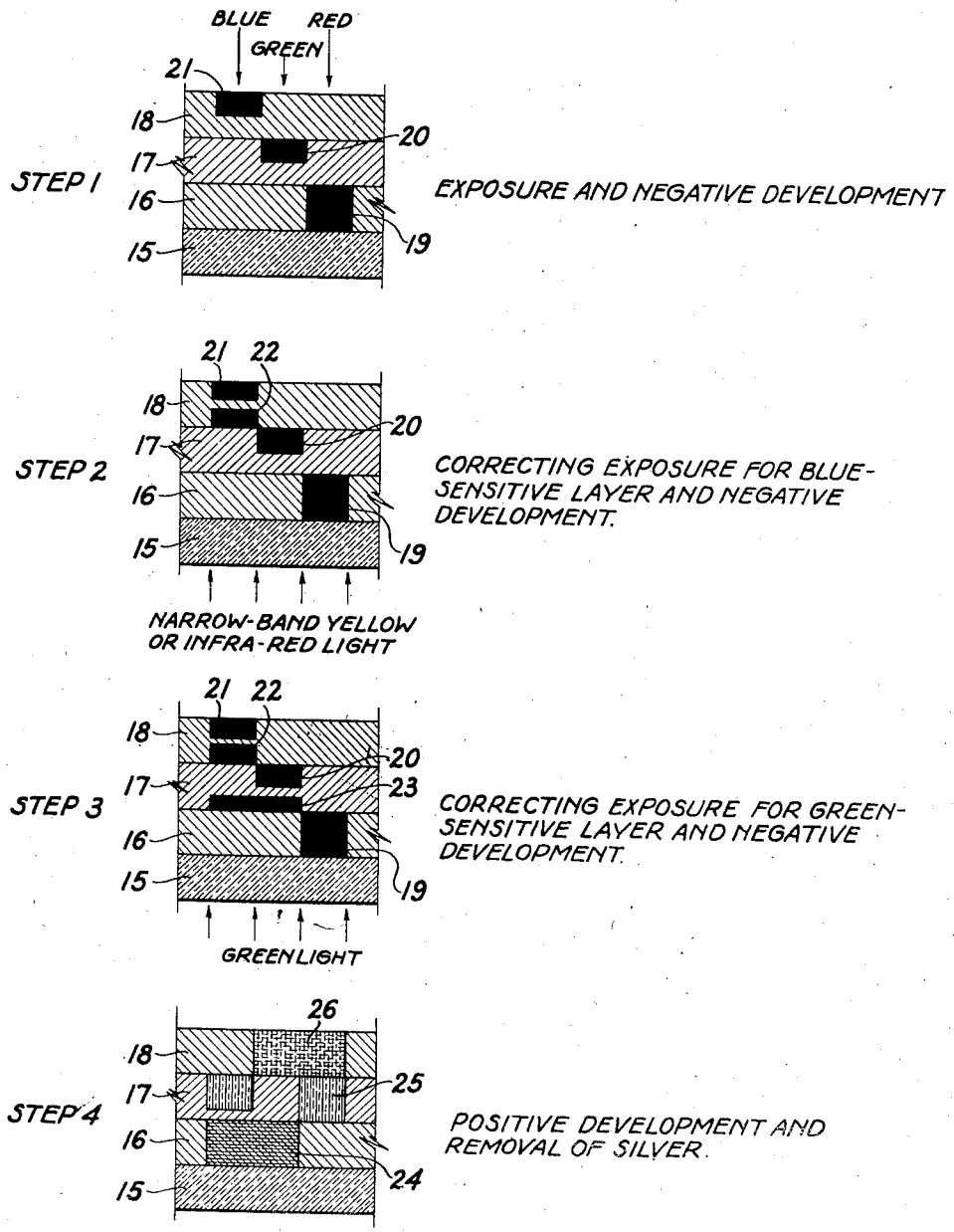

Patented Jan. 12, 1943

2,307,996

UNITED STATES PATENT OFFICE 2,307,996

COLOR CORRECTION IN MULTILAYER COLOR FILM

Le Roy M. Dearing, Rochester, N. Y., assignor to Eastman Kodak Company, Rochester, N. Y., a corporation of New Jersey Application April 6, 1940, Serial No. 328,311

3 Claims. (Cl. 95—2)

This invention relates to color correction and particularly to the method for securing color correction in printing multi-layer color film.

It is well known that duplicates made from multi-color photographic originals have considerably desaturated blues and greens. This is due to the fact that some of the subtractive color dyes used in the film especially the blue-green and magenta dyes do not transmit blue light as thoroughly as they should. The blue-green dye may absorb as much as 20% of the blue light and the magenta dye as much as 15% of the blue light although both of these should be completely transparent to blue. The result of this absorption is that all of the blues on the original transparency will, during the duplicating printing exposure, prevent complete exposure of the blue-sensitive layer in the duplicating film or paper. When this film or paper is reversed during processing, it may, therefore, contain nearly 40% of yellow dye in what should be a clear blue area. As a result, skies and other parts of the scene which should appear blue frequently appear green in the duplicate.

This defect in color process is well known and has been overcome in practice by the use of various masking methods. For example, a low contrast red separation positive or such positive combined with a low contrast green separation positive has been used as a mask for the blue separation negative. Other separation negatives may be masked in a similar manner with suitable low contrast separation positives. In the case of the blue separation negative the masking effectively removes yellow contamination in those parts of the original which contained blue-green dye.

Masking methods of this type involve the production of separate, low contrast, separation positives and these must be registered with the original during printing. These are objectionable time-consuming and expensive features of masking methods and, therefore, they have not been widely used.

It is, therefore, the principal object of the present invention to provide a method for correction of multi-layer color films during printing. A further object is to provide a method for correction of multi-layer color films during processing after an original or negative exposure. Other objects will appear from the following description of my invention.

These objects are accomplished by exposing the film after the negative exposure and development so that at least one layer which ultimately contains an image forming dye having excessive absorption is exposed through a negative silver image in at least one other layer and the exposed portion then developed to a negative before exposure and development of the film to form positive images in it.

In the accompanying drawings,

Fig. 3 is a flow diagram illustrating the various steps in one form of the correction process constituting my invention, the steps being illustrated by means of sectional views across the film.

Figure 1:
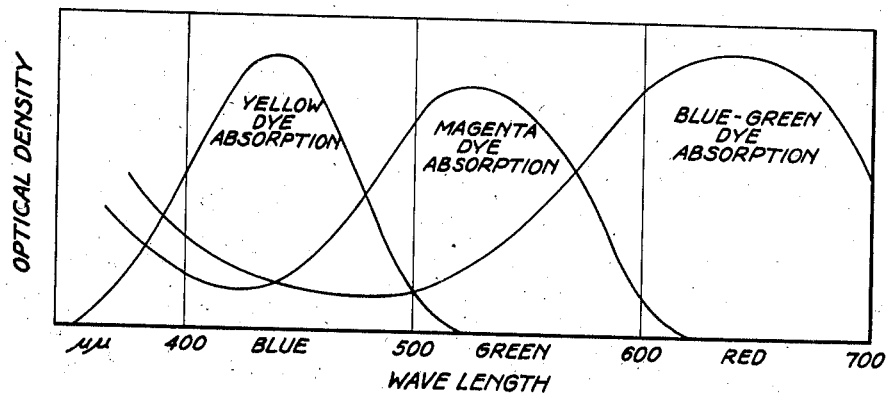
Fig. 1 is a graph illustrating typical absorption curves for the usual subtractive dyes used in color processes that is the yellow, magenta and blue-green dyes.

It is known that the subtractive magenta and blue-green dyes used in most subtractive photographic processes absorb light in regions which they should transmit. As shown in Fig. 1 which illustrates typical absorption spectra, the blue-green, in addition to absorbing properly in the red region, also absorbs some light in the green and the blue regions. The magenta dye in addition to absorbing properly in the green region also absorbs some light in the blue region. The yellow dye is the best of the three although it does have a slight absorption in the green region where it should transmit. It is evident, therefore, that the largest correction is necessary for the blue-green and magenta dyes, that is in the blue and green regions of the spectrum.

In multi-color processes in which silver halide layers effectively sensitive to the blue, green and red regions of the spectrum are coated on a single support and colored images are formed in the layers by coupling, such as in the process described in Mannes and Godowsky U. S. Patent 2,113,329, April 5, 1938, it is customary to secure a separation of the colors by combined sensitizing and filtering methods. Since all silver halide emulsions are sensitive to the blue region of the spectrum, a yellow filter layer is usually incorporated between the blue-sensitive layer and the remaining layers or a yellow filtering material is incorporated in the blue sensitive layer itself. The layer which records the green rays is sensitive only to green and blue light and the layer which records the red rays is sensitive only to red and blue light. The blue sensitive layer is ordinarily coated outermost, that is, farthest from the support.

If a film of this type is used for printing according to my invention, it is necessary to prevent the action of blue light on the green and red sensitive emulsions while exposing the blue-sensitive emulsion during the correcting or masking exposure. This may be accomplished by giving a special sensitization to the blue-sensitive emulsion in a region to which the red and green sensitive emulsions are not sensitive. For example, the blue-sensitive emulsion might be sensitized in a narrow band in the yellow region which neither the red nor the green sensitive emulsions record or it might be sensitized in the infra red or in the extreme ultra-violet region. This special sensitizing is necessary only if the blue-sensitive emulsion is to be given a correcting exposure. Narrow-band sensitising of multi-layer duplicating material is disclosed in Mannes and Godowsky U. S. application Serial No. 307,140, filed December 1, 1939.

According to my invention, if the duplicate is to be corrected for the improper blue light absorption of the blue-green and magenta dyes this specially sensitized film must be used. After exposure and partial or complete negative development of this material, it is given a low intensity flash exposure of the same quality as the special sensitizing of the blue emulsion. This flash exposure is made through the support if the blue sensitive emulsion is outermost so that the green and red silver negatives act as masks. A second negative development follows this flash exposure and this second negative development produces silver in the blue-sensitive emulsion in those regions where the blue-green and magenta dyes of the original prevented complete blue exposure. Yellow contamination of the blues in the duplicate is to be avoided. The film is then reversed and color developed or treated in any other suitable manner to form positive dye images in the layers.

Multi-layer color duplicating films are generally given a narrow band sensitivity so that they are rather sharply sensitized in the blue, green and red regions of the spectrum. The material used in my invention would retain this narrow band sensitizing used for the ordinary printing exposures from the original. In addition to this narrow band sensitizing the blue-sensitive emulsion also carries a narrow band sensitizing in any of the three regions at a band to which the green and red sensitive emulsions are not sensitive. This might be either in the yellow region or in the infra red region. It is also necessary that the filter layer usually present between the blue sensitive emulsion and the other emulsions, if it has not been destroyed in the negative development, transmit fairly well in the region of the narrow band masking sensitizing of the blue sensitive emulsion layer.

In addition to the blue separation negative, it is also possible that the complementary dyes of the original are of such impurity that the green or red separation negatives also need a masking exposure. For example, the magenta or yellow dye may not transmit all of the red or the blue-green dye may not transmit all of the green. The latter case is the one we found in practice.

In this case it is unnecessary to use a special sensitizing emulsion for the duplicating material. This is due to the fact that the usual narrow band sensitizing of duplicating films in the green and red sensitive layers are sufficiently well separated that they can be used for the masking exposure as well as for the regular printing exposure. If desired, however, a separate narrow band sensitization for the masking exposure can be incorporated in the duplicating material.

When a correction of the green or the red separation negatives is desirable, the green-sensitive emulsion may be flashed during or after negative development, through the red separation negative record. If the green sensitive layer is in the middle and the red sensitive layer nearest the support, the film would be flashed through the support with green light to which only the middle layer is sensitive. This flash exposure may be made at the same time as the flash exposure of the blue sensitive layer or subsequently. The amount of exposure should be equal to the amount of green light absorbed by the blue-green dye in the original as multiplied by a factor which takes into account the different sensitivity of the green layer after negative development compared with its initial sensitivity. If the yellow dye of the original had not transmitted sufficient green light a flash could be given from the top through the blue negative record into the green sensitive emulsion with this same light.

In a similar way the red sensitive layer can be given a flash masking exposure through the blue negative and the green negative records with a light corresponding to the quality of its own narrow band red sensitization. Any of these masking exposures may be made during or after negative development of the film at a time when there is silver negative image present. It may be desirable to make the flash exposure during development in order to secure lower contrast when a thin negative image is present.

After any or all of the masking exposures, the film is again placed in a negative developer to reduce the silver halide to metallic silver. Formation of a positive dye image can then be accomplished in any suitable manner. For example, the film may be color developed as described in Mannes and Godowsky U. S. Patent 2,113,329, or it may be colored by bleaching, toning or transfer. If the emulsion layers are precolored as in the film described in Christensen U. S. Patent 1,517,049, the positive images may be formed by bleaching.

My invention will now be described with particular reference to the accompanying drawings.

As shown in Fig. 1, the curves A, B and C represent respectively the yellow, magenta and blue-green absorption of the usual subtractive dyes when optical density is plotted against wave length in millimicrons. These are the absorption curves of average dyes and do not necessarily represent the absorption of actual dyes necessary for my process.

Figure 2:
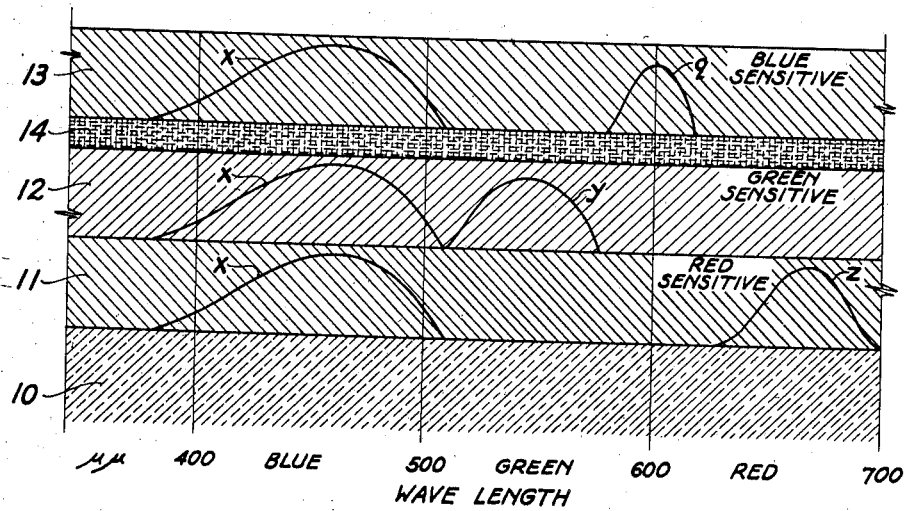
Fig. 2 is a graph illustrating the sensitivity of one type of film used according to my invention.

Fig. 2 is a combined graph and film section representing the sensitivity of one type of film suitable for use as printing material in my invention. As shown therein, a support 10 is coated with silver halide emulsion layers, 11, 12 and 13 sensitive respectively to the red, green and blue regions of the spectrum. As shown by the curves, X, the emulsion layers 11 and 12, are also sensitive to the blue region of the spectrum but exposure of these layers by blue light is prevented by the filter layer 14 between layers 12 and 13. Emulsion layer 12 is also sensitive to the green region of the spectrum as indicated at Y and emulsion layer 11 is sensitive to the red region of the spectrum as indicated at Z. In addition to its sensitivity in the blue region as indicated at X, emulsion layer 13 is also sensitive to a narrow band between the green and the red regions as indicated at Q. The masking exposure through the support may, therefore, be accomplished by means of light in the narrow spectral region Q without affecting either of the emulsion layers 11 and 12. Any silver negative image in layers 11 and 12 will, however, prevent exposure of layer 13 at that point during the masking exposure.

Fig. 3 is a flow chart illustrating steps in the corresponding exposure of a typical multi-layer film in which it is assumed that correction is to be made for the inadequate blue and green transmission of the blue-green and magenta dyes of the original. This chart also shows the multi-layer film in sectional views but illustrates the effect of the negative masking images rather than the effect of the sensitivity of the layers. The sensitivity of the film is assumed to be similar to that shown in Fig. 2.

As shown in Fig. 3 a support 15 of any suitable transparent material such as cellulose ester, synthetic resin or paper is coated with emulsion layers 16, 17 and 18 effectively sensitive respectively to the red, green and blue regions of the spectrum. It is to be understood that the effect of blue light on emulsion layers 16 and 17 is prevented by means of a yellow filtering material, not shown.

Exposure to a color transparency or to a natural scene in the camera and negative development produces in this material negative images 19, 20 and 21, assuming that portions of the spectrum in the red, green and blue regions are present in the exposing light. The inadequate blue and green transmission of dyes in the original produces an incomplete exposure of the blue and green sensitive layers and therefore an incomplete negative image as shown at 20 and 21. If this film were exposed and developed to a positive immediately, these incompletely exposed blue and green regions would develop dye images and would produce a yellow and magenta contamination which was not present in the original.

In order to overcome this undesirable yellow and magenta contamination, the film is first given a masking exposure through the support with light of the color to which the layer 18 is sensitive but not layers 16 and 17, that is either to the narrow band yellow or the infra red rays. This exposure affects only layer 18 at the places where there is no negative image in the layers 16 and 17. In the present case the silver images 19 and 20 prevent exposure of the layer 18 except at the region 22 and a silver image is therefore formed in this place on further negative development.

In order to correct for the undesirable green absorption of the blue-green dye, a further masking exposure is given to green light through the support this exposure affecting only the green sensitive layer 17. During this exposure the silver negative image 19 prevents exposure of the green sensitive layer at this portion and since layer 18 is not sensitive to green light it is unaffected. The only exposure of layer 17, therefore, is at the region 23 and a negative silver image is formed at this point upon further development. A short exposure is made to green light, to prevent the formation of a dense image in the portions of the layer 17 where there is no silver image 20.

It will be understood that the masking exposure of both the green sensitive layer and the blue sensitive layer may be performed simultaneously or if performed successively that the development may be made simultaneously.

The film is then treated in any suitable way to form positive dye images in the layer. For example, by color forming development dye images 24, 25 and 26 colored blue green, magenta and yellow, respectively, are formed in the layers as shown in step 4.

Although my process has been described with particular reference to duplicating or printing multi-layer color film onto a similar material, it is to be understood that my process may also be used for correction in a negative process that is in the development of film exposed in a camera provided that suitably sensitized material is used or that my process can be applied to negative-positive methods and that various methods of forming the positive dye images may be used. The examples given are illustrative only and it is to be understood that my invention should be limited only by the scope of the appended claims.

I claim:

1. The method of forming a corrected image in natural colors in a multi-layer photographic material having superposed layers sensitive in order to the blue, green and red regions of the spectrum, the blue sensitive layer having an additional sensitivity in a region to which the green sensitive and the red sensitive layers are not sensitive, which comprises exposing the material and developing it to negative silver images in all layers, exposing the blue-sensitive layer through the negative silver images in the green and red sensitive layers, exposing the green sensitive layer through the negative silver image in the red sensitive layer, developing said exposed layers to negative silver images supplementing the original negative silver images formed therein and then forming positive dye images in the layers at the places of the residual, undeveloped, silver halide.

2. The method of forming a corrected image in natural colors in a multi-layer photographic material having superposed layers sensitive respectively to the blue, green, and red regions of the spectrum, the blue-sensitive layer having an additional sensitivity in a region to which the green-sensitive and red-sensitive layers are not sensitive, which comprises exposing the material and developing it to negative silver images in all exposed layers, and then, without removing said negative silver images exposing, through the red-sensitive layer, at least one layer of the material which ultimately contains an image-forming dye having excessive absorption in the region to which that layer is sensitive, developing said exposed layer to a negative silver image supplementing the original, negative silver image formed therein, and then forming positive dye images in the layers at the places of the residual, undeveloped silver halide.

3. The method of forming a corrected image in natural colors in a multi-layer photographic material having superposed layers sensitive in order to the blue, green and red regions of the spectrum, the blue-sensitive layer having an additional sensitivity in a region to which the green sensitive and red sensitive layers are not sensitive, which comprises exposing the material to a colored photographic image and partially developing it to negative silver images in all layers, flash-exposing the blue-sensitive layer through the partial negative silver images in the green and red-sensitive layers, developing said exposed layer to negative silver images supplementing the original negative silver images formed therein, and then forming positive dye images in the layers at the places of the residual, undeveloped silver halide.

LE ROY M. DEARING.